(12) United States Patent
Mukai et al.

(10) Patent No.: US 8,736,226 B2
(45) Date of Patent: May 27, 2014

(54) CHARGING CABLE, CHARGING CABLE UNIT, AND CHARGING SYSTEM FOR ELECTRIC VEHICLE

(75) Inventors: Tatsuya Mukai, Tsu (JP); Youji Minami, Nagoya (JP); Satoru Ueno, Osaka (JP); Kiyoshi Goto, Amagasaki (JP); Shiro Mori, Tsu (JP); Hirotoshi Watanabe, Tsu (JP); Kouji Kakiuchi, Tsu (JP); Hiroshi Ooya, Tsu (JP); Tomoyoshi Hayashi, Tsu (JP); Yutaka Takada, Tsu (JP)

(73) Assignee: Panasonic Corporation, Osaka (JP)

( * ) Notice: Subject to any disclaimer, the term of this patent is extended or adjusted under 35 U.S.C. 154(b) by 324 days.

(21) Appl. No.: 13/126,501

(22) PCT Filed: Oct. 22, 2009

(86) PCT No.: PCT/IB2009/007194
§ 371 (c)(1),
(2), (4) Date: Apr. 28, 2011

(87) PCT Pub. No.: WO2010/049775
PCT Pub. Date: May 6, 2010

(65) Prior Publication Data
US 2011/0204849 A1 Aug. 25, 2011

(30) Foreign Application Priority Data

Oct. 28, 2008 (JP) .................................. 2008-277394
Oct. 28, 2008 (JP) .................................. 2008-277395
Oct. 28, 2008 (JP) .................................. 2008-277422

(51) Int. Cl.
*H02J 7/14* (2006.01)
*H02J 7/00* (2006.01)
*H01R 11/00* (2006.01)
*H01R 31/08* (2006.01)

(52) U.S. Cl.
USPC ............ 320/104; 320/109; 439/503; 439/508

(58) Field of Classification Search
USPC ................... 320/109, 104, 111; 439/503, 508
See application file for complete search history.

(56) References Cited

U.S. PATENT DOCUMENTS 5,433,623 A * 7/1995 Wakata et al. ................. 439/310
5,596,261 A 1/1997 Suyama
(Continued)

FOREIGN PATENT DOCUMENTS

CN 1601824 A 3/2005
JP 5211724 8/1993
(Continued)

OTHER PUBLICATIONS

Office Action dated Nov. 29, 2013 issued in corresponding Chinese application No. 200980142900.7.

*Primary Examiner* — M'Baye Diao
(74) *Attorney, Agent, or Firm* — Bacon & Thomas, PLLC

(57) ABSTRACT

A charging cable for an electric vehicle includes a power plug adapted to be detachably connected to a power socket of a commercial power source; a temperature detecting unit for detecting a temperature of the power plug; a cable connector adapted to be detachably connected to an electric vehicle for supplying a charging current to a battery of the electric vehicle; and a switching unit for opening and closing a current path between the power plug and the cable connector. The charging cable further includes a leakage detecting unit for detecting an electric leakage based on a current flowing through the current path; and a power cutoff unit for opening the switching unit when the detected temperature of the temperature detection means exceeds a threshold value or when the leakage detection means detects the electric leakage.

6 Claims, 20 Drawing Sheets

(56) References Cited

U.S. PATENT DOCUMENTS

| | | | |
|---|---|---|---|
| 5,614,808 A * | 3/1997 | Konoya et al. | 320/109 |
| 5,757,595 A * | 5/1998 | Ozawa et al. | 340/636.1 |
| 6,123,569 A * | 9/2000 | Fukushima et al. | 439/456 |
| 6,308,123 B1 | 10/2001 | Ikegaya et al. | |
| 6,692,284 B1 | 2/2004 | Koh | |
| 8,278,882 B2 * | 10/2012 | Gotou et al. | 320/163 |
| 2002/0097546 A1 | 7/2002 | Weinberger | |
| 2004/0136125 A1* | 7/2004 | Nemir et al. | 361/42 |
| 2006/0006840 A1* | 1/2006 | Furukawa | 320/116 |
| 2007/0006603 A1* | 1/2007 | Reusche et al. | 62/196.4 |
| 2008/0084289 A1* | 4/2008 | White et al. | 340/449 |
| 2009/0179615 A1* | 7/2009 | Amron | 320/114 |
| 2009/0316321 A1* | 12/2009 | Ouwerkerk | 361/106 |

FOREIGN PATENT DOCUMENTS

| | | |
|---|---|---|
| JP | 5276674 | 10/1993 |
| JP | 200110518 | 1/2001 |
| WO | 2007141543 A2 | 12/2007 |

* cited by examiner

CHARGING CABLE, CHARGING CABLE UNIT, AND CHARGING SYSTEM FOR ELECTRIC VEHICLE

FIELD OF THE INVENTION

The present invention relates to a charging cable, a charging cable unit, and a charging system which are used to charge a battery of an electric vehicle.

BACKGROUND OF THE INVENTION

Recently, electric vehicles, including a hybrid car that runs on a combination of electric power stored in a secondary cell and fuel, such as gasoline, as a power source, and a secondary cell vehicle that runs on electric power stored in a secondary battery as a power source, have been put into practical use. These electric vehicles include an electric vehicle (for example, a plug-in hybrid car) whose battery is charged with electric power supplied from a commercial power source at a private home. For charging the battery, an electric vehicle charging cable is used in order to connect a socket outlet of the commercial power source and a connector of the electric vehicle.

As this type of battery, there is included a battery requiring a high voltage of about, e.g., 200 to 300V. Also, there is included a battery using a high voltage of 200V as commercial power for charging. Therefore, there arises a safety concern for an electric vehicle or an electric vehicle charging cable.

Further, at an ordinary home, an electric vehicle is usually parked in an outdoor parking space, a car port installed outdoors, or the like. When the battery of the electric vehicle is charged, a charging cable for the electric vehicle is plugged in a waterproof power socket of a fall-out preventing structure provided on an outside wall of a house and is supplied with commercial power from the waterproof power socket to thereby charge the battery. Further, when the electric vehicle is not charged, for example, when the electric vehicle is driven out, it can be considered that the electric vehicle charging cable is accommodated indoors or inside the electric vehicle, e.g., in the trunk. That is, the electric vehicle charging cable is plugged into or pulled out of the waterproof power socket whenever it is used.

In addition, the fall-out prevention type of the waterproof power socket provided on the outside wall of the house has been designed under the assumption that a plug would be kept plugged in the socket for a long period of time. Therefore, if the plug is frequently pulled out and inserted, abnormal heating may be generated due to an imperfect connection. Also, there is a possibility that abnormal heating will be induced by a tracking phenomenon due to high humidity and large amounts of particles and dust outdoors accumulated.

In order to address the above, there has been conventionally suggested a power feed coupler which detects an increase in temperature during the time of charging of a battery and stops the power feeding once an abnormal temperature rise is detected to thereby prevent abnormal heating (see, e.g., Patent Document 1). The power feed coupler disclosed in the above document is provided with a thermistor serving as a temperature detection means in a case having a primary coil therein. When the temperature of the power feed coupler exceeds a set temperature, a temperature abnormality is detected by an increase in resistance of the thermistor such that the power feeding is stopped.

In addition to a bad connection or abnormal heating induced by the tracking phenomenon, there is a possibility that, if an electric leakage occurs during the time of charging a battery by using a high voltage as mentioned above, an excessive current flows and stress is put on the battery or the charging circuit. Due to this, there is a need to avoid abnormal heating or electric leakage by a combination of multiple means, e.g., by providing the power feed coupler of Patent Document 1 and an electric leakage breaker in the power feeding path of the commercial power source. This results in high cost of the equipment and much time for installation.

FIG. 16A shows an example of the charging cable unit AA. A cable connector G provided at one end of a cable 6 is connected to a connector of an electric vehicle, and a plug 3' provided at the other end of the cable 6 is inserted and connected to the socket BB of a commercial power source, so that a commercial power is supplied to the electric vehicle C to charge a secondary cell installed in the electric vehicle C. FIG. 16B shows the charging cable unit AA' provided with an electric leakage breaker 5'. When detecting an electric leakage, the earth leakage breaker 5' cuts off the power feeding to the electric vehicle C (see, e.g., Patent Document 2).

With the charging cable unit AA' disclosed in Patent Document 2, an electric power can be supplied to charge the secondary cell of the electric vehicle C. However, an amount of power consumed for charging the electric vehicle C or the electricity cost cannot be checked and further an elapsed charging time, charging completion time, or the like cannot be displayed. Accordingly, a user has to directly check the charging cable unit to know whether charging is complete or not, thereby making it inconvenient.

Conventionally, there have been proposed charging systems that can display charging information relating to a secondary cell installed in an electric vehicle or an emergency battery. FIG. 17 depicts one of the charging systems wherein the display function is provided in the electric vehicle C or in the emergency battery D. With this system, the user can find out the charging status of the secondary cell when he is near the electric vehicle C or the emergency battery D, but cannot when he is at a location (e.g., at home) away from a charging place.

In order to address the above drawbacks, there is proposed a charging system which is configured to keep track of the charging status of the secondary cell even when the user is at a location away from a charging place (see, e.g., Patent Document 3). With this system, wireless communications are performed between a transmitter provided at an electric vehicle and a receiver provided at a display device. Thus, charging information of the secondary cell is transmitted from the transmitter of the electric vehicle to the display device that can display the charging information received by the receiver.

With the charging system disclosed in Patent Document 3, the user can check the charging status even if he is at home by having the display device installed at home. However, when it is intended to apply this system to an emergency battery for example, this system can be applied only to an emergency battery equipped with a transmission function because the transmitter is installed at the electric vehicle in the charging system disclosed in Patent Document 3, thereby imposing a limitation to a wide application.

Patent Document 1: Japanese Patent Laid-Open Application No. 2001-10518

Patent Document 2: Japanese Patent Laid-Open Application No. H 5-276674 (Paragraph Nos. [0012] to [0015] and FIG. 1)

Patent Document 3: Japanese Patent Laid-Open Application No. H 5-211724 (Paragraph Nos. [0009] to [0013] and FIG. 1)

SUMMARY OF THE INVENTION

In view of the above, the present invention provides an electric vehicle charging cable at a low cost which can detect an abnormal heating or electric leakage to stop charging. Further, the present invention provides an easy-to-use charging cable unit which makes it unnecessary for a user to visit to a charging place many times to check a charging status. Moreover, the present invention provides a charging system with high flexibility which the user can find out the charging status of a secondary cell even at a location away from a charging place.

In accordance with a first aspect of the present invention, there is provided a charging cable for an electric vehicle including a power plug adapted to be detachably connected to a power socket of a commercial power source; a temperature detecting unit for detecting a temperature of the power plug; a cable connector adapted to be detachably connected to an electric vehicle for supplying a charging current to a battery of the electric vehicle; and a switching unit for opening and closing a current path between the power plug and the cable connector. The charging cable further includes a leakage detecting unit for detecting an electric leakage based on a current flowing through the current path; and a power cutoff unit for opening the switching unit when the detected temperature of the temperature detection means exceeds a threshold value or when the leakage detection means detects the electric leakage.

In accordance with a second aspect of the present invention, there is a charging cable unit for an electric vehicle including the charging cable as defined above and a display device including a power calculating unit for integrating an amount of power supplied to a power receiving device and a display unit for displaying an integrated amount of the power calculating unit.

In accordance with a third aspect of the present invention, there is a charging system for an electric vehicle including the charging cable as defined above; a transmission apparatus including a charging information acquisition unit for obtaining charging information relating to a secondary cell and a transmission unit for transmitting the acquired charging information; and a display device including a receiving unit for receiving a signal of the charging information transmitted from the transmission apparatus and a display unit for displaying the received charging information. Further, in the charging system, the display device is provided separately from the charging cable, and the charging information is an integrated amount of power.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described in more detail with reference to accompanying drawings which form a part hereof.

First Embodiment

Referring to FIGS. 1 and 2A to 2C, a first embodiment of the present invention will be described below.

Figure 1:
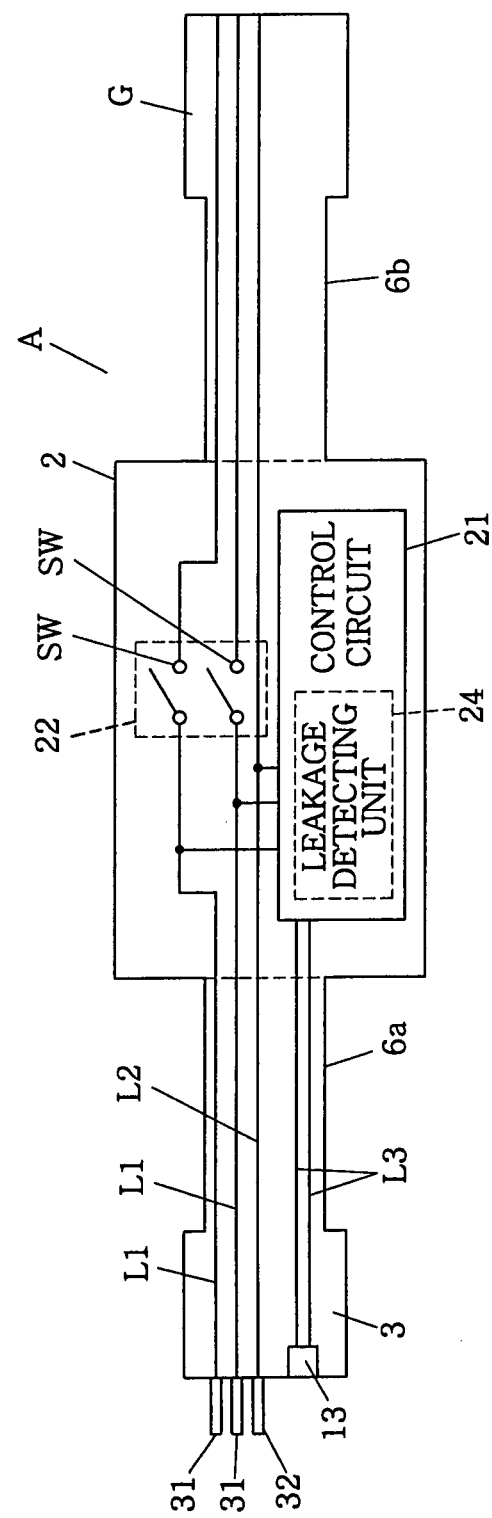
FIG. 1 is a schematic circuit diagram of a charging cable for an electric vehicle in accordance with a first embodiment of the present invention.
Figure 2A:
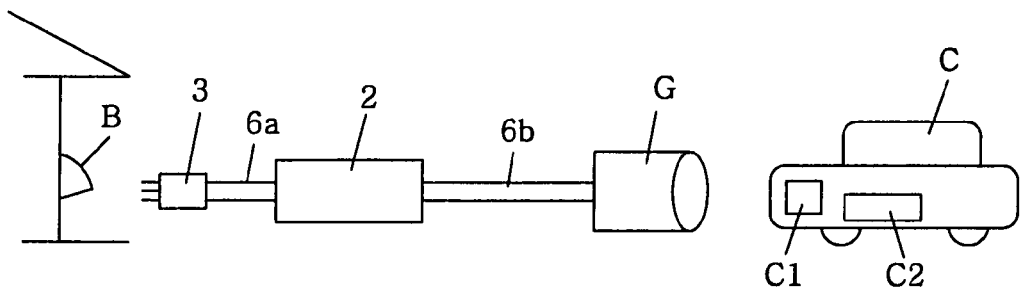
FIG. 2A is a schematic view showing an example in which the charging cable of the first embodiment is used.
Figure 2B:
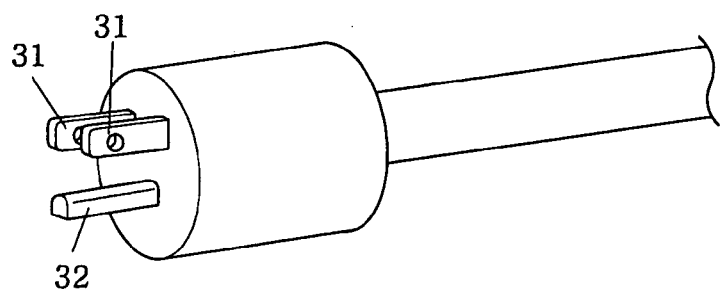
FIGS. 2B and 2C are a perspective view and a cross-sectional view showing a various parts of the charging cable of the first embodiment, respectively.
Figure 2C:
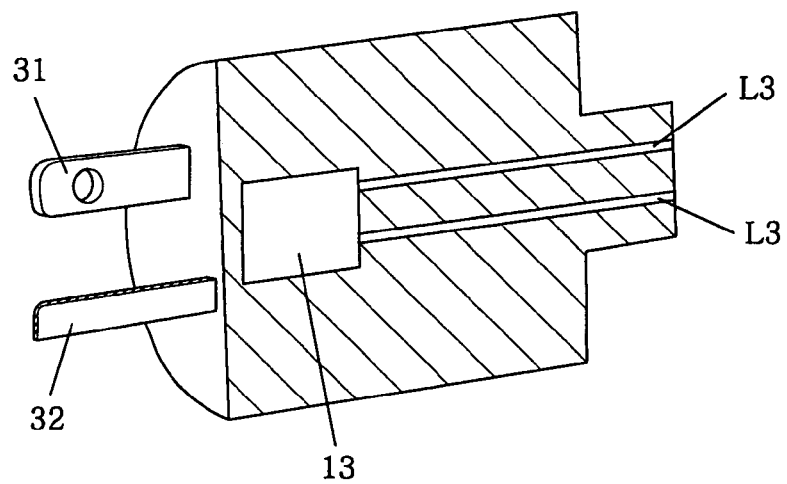

FIG. 1 is a schematic circuit diagram of a charging cable for an electric vehicle in accordance with the first embodiment of the present invention. FIG. 2A shows an example in which the charging cable is used to charge a battery to be used for driving an electric vehicle, FIG. 2B shows main parts of a plug of the charging cable, and FIG. 2C is a cross-sectional view thereof.

A charging cable A for an electric vehicle is, as shown in FIG. 2A, connected between a power outlet socket B provided on an outside wall of a house and a vehicle connector C1 of an electric vehicle C parked in a parking space outside the house to charge a driving battery C2 mounted on the electric vehicle C.

The power outlet socket B is of, e.g., a fall-out prevention structure for preventing a power plug from falling out because of its weight, and also has a waterproof structure for preventing electrodes from short-circuiting because of rainwater. Moreover, the power outlet socket B is an outlet socket with two ground electrodes which is standardized by JIS C 8303, and is connected to a power source, e.g., a single-phase two-wired commercial power source (not shown) that supplies AC 100 V. The vehicle connector C1 and the battery C2 provided at the electric vehicle C are connected via a power cable and a charging circuit which are not shown, and the charging circuit is supplied with a commercial power through the vehicle connector C1 to thereby charging the battery C2.

The charging cable A includes a power plug 3 detachably connected to the power outlet socket B, a cable connector G connected to the vehicle connector C1 to perform the power supply, a power cable 6 (6a, 6b) connecting the power plug 3 and the cable connector G and serving as a supply path of the commercial power supplied, and a control box 2 provided on the power cable 6.

The power plug 3 has connection terminals 31 and 32, which in turn connected to power lines L1 and a ground line L2 included inside the power cable 6a, respectively. The connecting terminals 31 are terminals which are supplied with an AC power from the power outlet socket B, and the connecting terminal 32 is a grounded terminal. As shown in FIG. 2C, the power plug 3 has a temperature sensor 13 buried therein, e.g., a resistance temperature detector and a temperature signal from the temperature sensor 13 is transmitted to a control circuit 21 via signal lines L3. Further, these lines L1, L2 and L3 are bound together and coated with an insulating material to thereby form the power cable 6a.

The control box 2 includes a switching circuit 22 and the control circuit 21. The switching circuit 22 opens and closes the power lines L1 which serve as a part of the supply path for supplying an electric power between the power plug 3 and the vehicle connector G. When detecting an abnormal state during the time of charging, the control circuit 21 opens the supply path with the switching circuit 22 to thereby stop supplying the commercial power.

The control circuit 21 is connected to the power lines L1 and the ground line L2, and operates on a commercial power supplied via the lines L1, L1, and L2 by using it as an operating power source. The control circuit 21 has a leakage detecting unit 24 which detects an electric leakage by monitoring currents flowing in the lines L1. When the leakage detecting unit 24 detects an electric leakage, the control circuit 21 sends a signal containing a command to open the transfer path to the switching circuit 22.

Further, the control circuit 21 is connected to the temperature sensor 13 via the signal line L3. If a temperature signal inputted from the temperature sensor 13 exceeds a threshold, the control circuit 21 sends a signal containing a command to open the supply path to the switching circuit 22. Thus, a temperature detection means is implemented by the control circuit 21 and the temperature sensor 13, and an electric leakage detection means includes the leakage detection unit 24 in the control circuit 21.

The switching circuit 22 has switches SW for opening and closing the lines L1, receives a signal from the control circuit 21 to open and close the switches SW, and thereby switches on/off the supply of the commercial power source from the power plug 3 to the cable connector G.

When the power plug 3 is connected to the power outlet socket B, the electric power from the commercial power source is supplied to the control circuit 21 via the lines L1 and L2. Since the switching circuit 22 is closed initially, the electric power from the commercial power source is supplied to the cable connector G and charging of the battery C2 is performed when the cable connector G is connected to the vehicle connector C1. While charging the battery, the control circuit 21 operates on the electric power from the commercial power source and measures detected temperature by the temperature sensor 13 and a current or a voltage in the circuit.

Meanwhile, if an insulation state between the terminals is deteriorated due to particles or dust containing moisture, which are piled up in the power outlet socket B or the power plug 3, heat is generated by a contact failure between the power outlet socket B and the power plug 3 and a temperature being detected by the temperature sensor 13 becomes higher. When the detected temperature from the temperature sensor 13 exceeds a temperature preset in the control circuit 21, the control circuit 21 sends a signal to cut off the power to the switching circuit 22. The switching circuit 22 receives the signal and opens the switch SW to cut off the current flowing through the lines L1, thereby stopping the charging of the battery C2.

On the other hand, if an electric leakage occurs due to damage in the vehicle connector C1 or the power cable 6 while charging the battery C2, the control circuit 21 detects the electric leakage and sends a signal for cutting off the power to the switching circuit 22. Upon receiving the signal, the switching circuit 22 opens the switch SW to cut off the current flowing through the lines L1, thereby stopping the charging of the battery C2. A method of detecting an electric leakage is well-known and a description thereof will be omitted.

In this way, while charging the battery C2, when the temperature of the power plug 3 rises or an electric leakage occurs, the control circuit 21 can detect them and immediately stop the charging, thus ensuring safe charging of the battery C2. Besides, since the switching circuit 22 is shared by the temperature sensor 13 and the control circuit 21 which are serving as a temperature detection means and the leakage detecting unit 24 serving as an electric leakage detection means, a charging cable for an electric vehicle can be provided at a low cost.

In this embodiment, although the commercial power source of AC 100V is employed, a high voltage power source of AC 200V or the like may be used. At this time, the power plug 3 may be of a shape adequate for the voltage of a power source and detachably connected to the power socket B.

Second Embodiment

Hereinafter, a second embodiment of the present invention will be described with reference to FIGS. 3A and 3B and FIGS. 4A and 4B. In this embodiment, same reference numerals are assigned to components same as those of the first embodiment and a description thereof will be omitted.

Figure 3A:
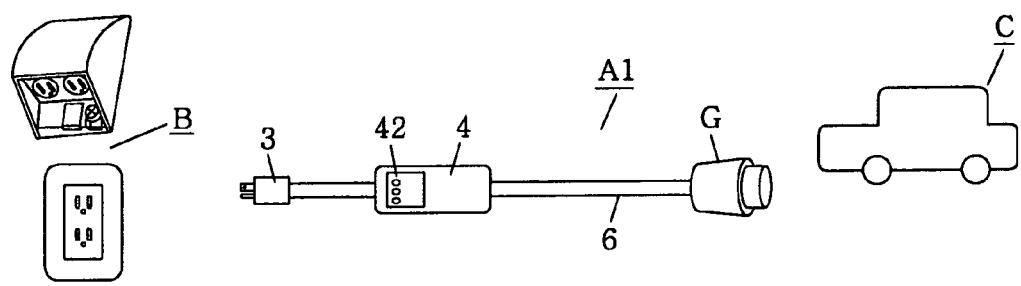
FIG. 3A is a schematic view of a charging cable unit in accordance with a second embodiment of the present invention.

FIG. 3A is a schematic view of a system using a charging cable unit A1 of the second embodiment. The charging cable unit A1 of this embodiment includes a power plug 3, a cable connector G, and a display device 4. The power plug 3 is detachably connected to a power socket B (e.g., embedded socket, waterproof socket, or the like) which is supplied with, e.g., a commercial power source. The cable connector G is electrically connected to the power plug 3 via a power cable 6, and detachably connected to a connector (not shown) of an electric vehicle (an equipment to be powered) C which is supplied with a commercial power source to charge a secondary cell mounted therein. The display device 4 is provided on the power cable 6. The cable connector G is conventionally well known and a detailed description thereof will be omitted. In this embodiment, the electric vehicle C includes a so-called hybrid car that runs on a combination of a secondary cell (battery) and gasoline as a power source, as well as a car that runs only on a secondary battery as a power source.

Figure 4A:
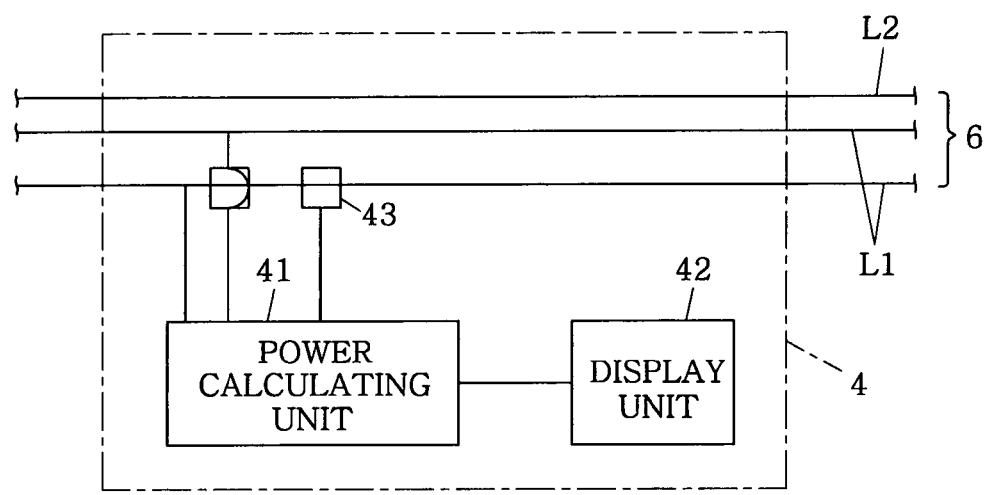
FIG. 4A is a schematic block diagram of a display device of the charging cable unit in accordance with the second embodiment.

The display device 4 displays charging information or the like of the electric vehicle C and, as shown in FIG. 4A, includes a current measuring unit 43 (e.g., current transformer) for measuring current flowing through one of power lines L1, a power calculating unit 41 (e.g., power meter) for integrating an amount of power supplied to the electric vehicle C based on a measurement result from the current measuring unit 43 and a power supply voltage supplied to the power calculating unit 41. The display device 4 further includes a display unit (display) 42 for displaying an integrated result of the power calculating unit 41. A reference numeral L2 shown in FIG. 4A represents a ground line.

Figure 4B:
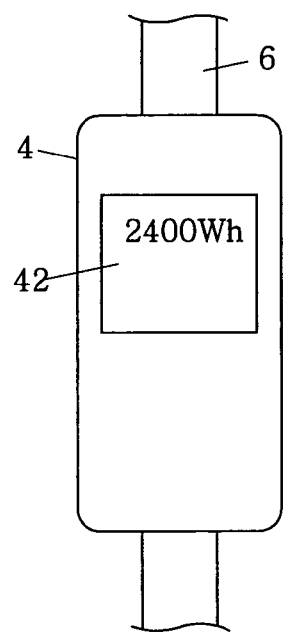
FIG. 4B shows an example of the display device thereof.

The display unit 42 includes, e.g., a liquid crystal panel, and, as shown in FIG. 4B, is provided to expose on one surface of a rectangular device body, which numerically displays the integrated amount of power (an calculated result by the power calculating unit 41) since the start of power feeding to the electric vehicle C.

When the cable connector G is connected to the connector of the electric vehicle C and the power plug 3 is plugged in the power socket B, the commercial power is supplied to the electric vehicle C to thus perform the charging of the secondary cell mounted in the electric vehicle C. Meanwhile, the power calculating unit 41 integrates the amount of power consumed in the charging based on the measurement result from the current measuring unit 43 and the power supply voltage supplied to the power calculating unit 41. In addition, the integrated result of the power calculating unit 41 is displayed on the display unit 42 (see, e.g., FIG. 4B).

With this embodiment, since the amount of power supplied to the electric vehicle C is displayed on the display unit 42, it can estimate the time when the charging will be completed based on the amount of power being displayed. Accordingly, by using the charging cable unit A1, it is not necessary for the user to visit the charging place many times to check the charging status, unlike in the conventional example, thereby making it easy for the user to find out the charging completion time because it can be estimated.

Figure 3B:
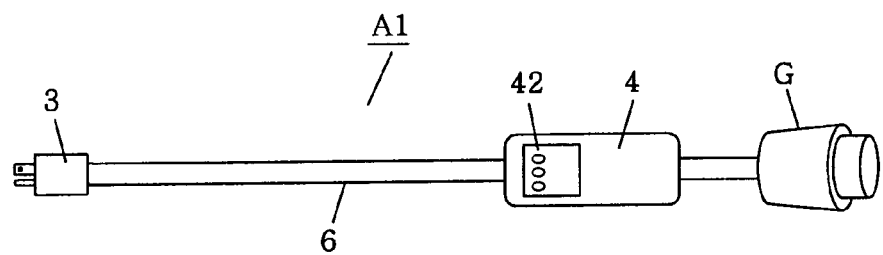
FIG. 3B is a plane view showing another example of the charging cable unit of the second embodiment.

Additionally, although the display device 4 is disposed on the side of the power plug 3 in FIG. 3A, it may be disposed on the side of the cable connector G as shown in FIG. 3B, and the arrangement position of the display device 4 is not specially limited. Also, the display unit 42 is not limited to a liquid crystal panel, but may include, e.g., a 7-segment display.

Third Embodiment

Hereinafter, a charging cable unit in accordance with a third embodiment of the present invention will be described with reference to FIGS. 5A to 5C and FIGS. 6A to 6D.

In the second embodiment, the integrated result (i.e., cumulative amount of power consumed in the charging of the electric vehicle C) of the power calculating unit 41 is displayed on the display unit 42, while this embodiment is different from the above in that electric charges or elapsed charging time, which is calculated on the basis of the integrated result, is displayed along with the integrated result on the display unit 42. Other configurations are the same as those of the second embodiment, and the same reference numerals are assigned to the same components so that a description of which will be omitted.

Figure 5A:
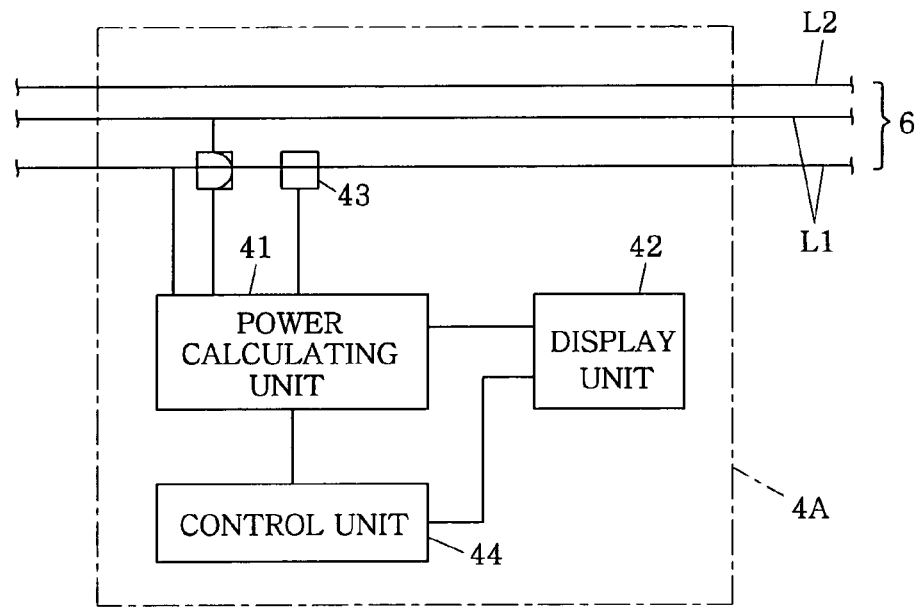
FIG. 5A is a schematic block diagram of a display device of a charging cable unit in accordance with a third embodiment.

The display device 4A of the charging cable unit in accordance with the third embodiment includes, as shown in FIG. 5A, a power calculating unit 41, a display unit 42, a current measuring unit 43, and a control unit 44.

The control unit 44 may be of, e.g., a CPU, and calculates electric charges and integrates an elapsed charging time based on the integrated result (i.e., cumulative amount of power consumed in the charging of the electric vehicle C) of the power calculating unit 41. In addition, as for the elapsed charging time, times during which a detected value at the current measuring unit 43 exceeds a predetermined value are integrated. Then, the calculated electric charges and the integrated elapsed charging time are numerically displayed on the display unit 42.

When the cable connector G is connected to the vehicle connector of the electric vehicle C and the power plug 3 is plugged in the power socket B, the commercial power is supplied to the electric vehicle C to thus perform the charging of the secondary cell installed in the electric vehicle C. Meanwhile, the power calculating unit 41 integrates the amount of power consumed in the charging based on the measurement result of the current measuring unit 43 and the power supply voltage supplied to the unit 41 itself.

Figure 5B:
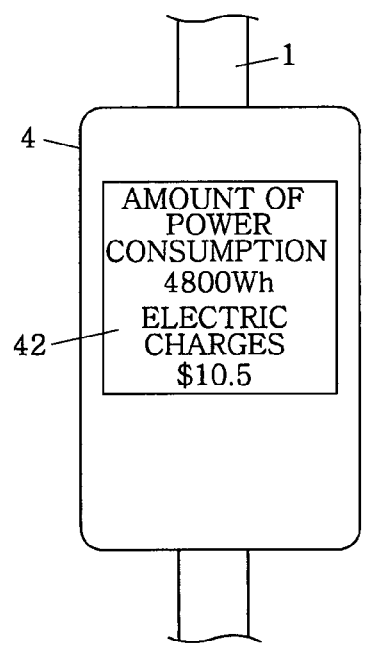
FIGS. 5B and 5C are examples of the display device thereof.
Figure 5C:
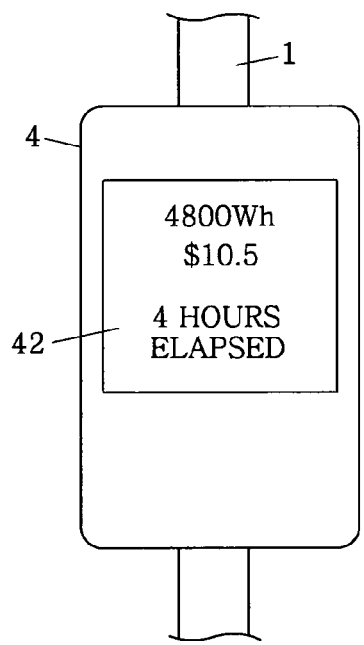

In addition, the control unit 44 calculates electricity cost and integrates an elapsed charging time on the basis of the integrated result of the power calculating unit 41. Then, the display unit 42 may display electricity cost along with an amount of power used (integrated result of the power calculating unit 41) as shown in FIG. 5B, or display electric charges and elapsed charging time along with the amount of power used as shown in FIG. 5C.

Figure 6A:
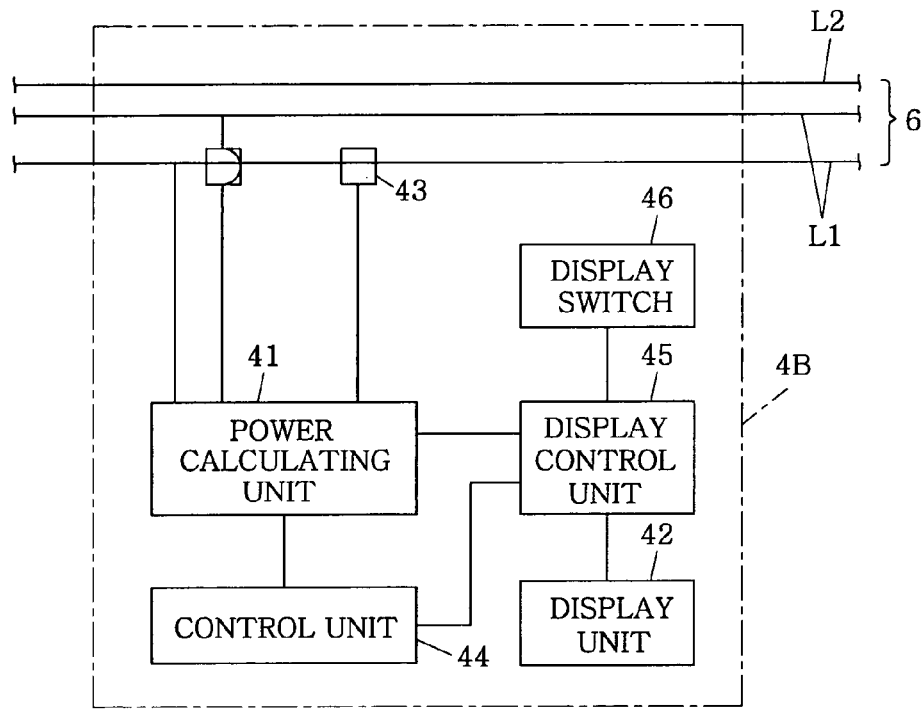
FIG. 6A is a schematic block diagram of another display device of the charging cable unit in accordance with the third embodiment.

Next, FIG. 6A is a schematic block diagram of another display device 4B of this embodiment. The display device 4B also displays electric charges and/or elapsed charging time along with the amount of power used as in the display device 4A shown in FIG. 5A (see FIGS. 5B and 5C). Further, the display device 4B can change contents to be displayed on the display unit 42 by pressing a display switch 46.

This display device 4B includes, as shown in FIG. 6A, a power calculating unit 41, a display unit 42, a current measuring unit 43, the control unit 44, a display control unit 45 for controlling the display unit 42, and the display switch 46 for changing over contents to be displayed on the display unit 42.

Figure 6B:
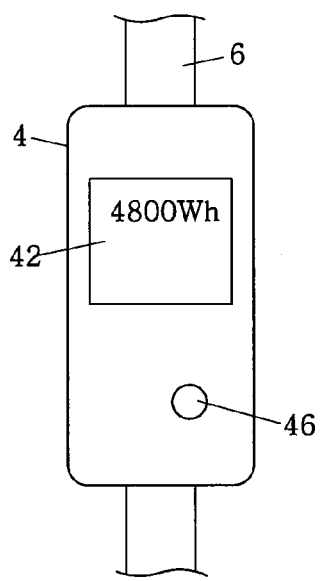
FIGS. 6B to 6D are examples of the another display device.
Figure 6C:
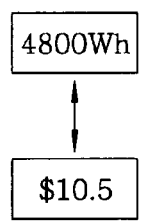

For example, provided that the displayed contents are switched between an amount of power used and electric charges, the display control unit 45 alternately switches the display of the display unit 42 between the amount of power used and electric charges from the state shown in FIG. 6B each time the display switch 46 is pressed (see FIG. 6C).

Figure 6D:
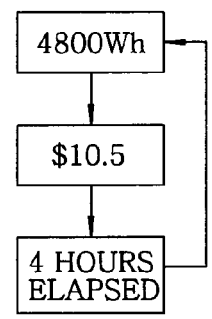

Further, if the displayed contents are switched among the amount of power used, electric charges, and an elapsed charging time, the display control unit 45 sequentially switches the display of the display unit 42 among the amount of power used, electric charges, and the elapsed charging time from the state shown in FIG. 6B each time the display switch 46 is pressed (see FIG. 6D). The sequence of the display is not limited to this embodiment.

With this embodiment, since the elapsed charging time is displayed along with the amount of power used (i.e., the amount of power supplied to the electric vehicle C), a charging cable unit which is easy to be used can be provided, like in the second embodiment. Moreover, in a case where electric charges is displayed, the user is able to know the electric charges required for one charging operation, thereby offering convenience to the user.

Fourth Embodiment

A charging cable unit in accordance with a fourth embodiment of the present invention will be described based on FIG. 7. This embodiment is different from the second and third embodiments in that charging information containing an estimated charging completion time is sent to the display device 4C from the electric vehicle C. The same components as the second and third embodiments are given the same reference numerals, and so a description thereof will be omitted.

Figure 7:
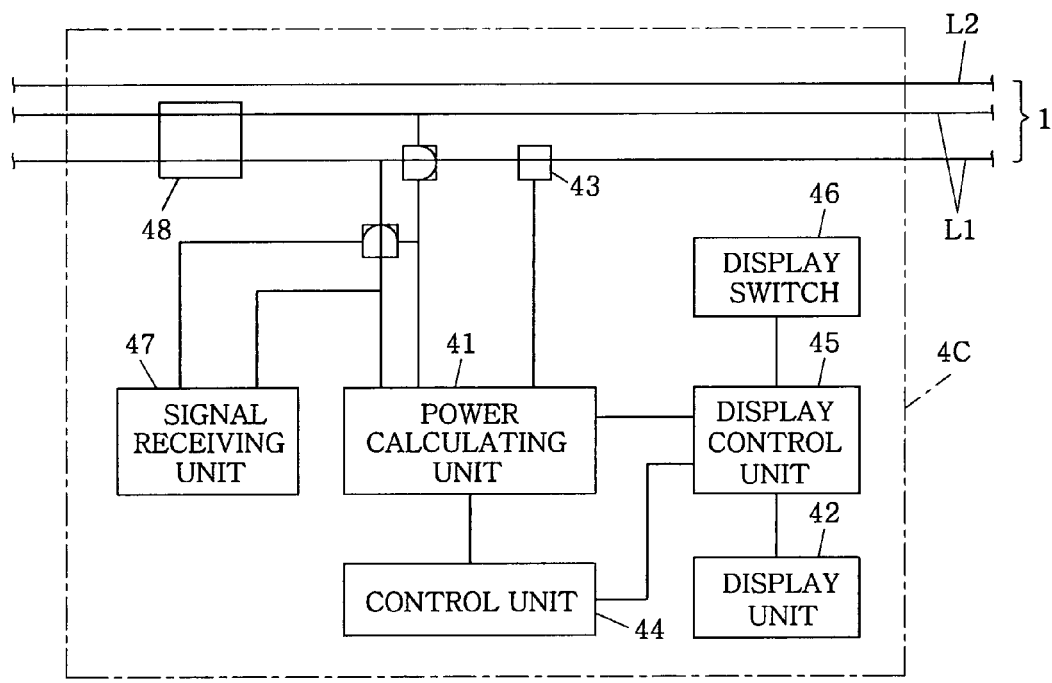
FIG. 7 is a schematic block diagram of a display device of a charging cable unit in accordance with a fourth embodiment.

The display device 4C of the charging cable unit in accordance with this embodiment includes, as shown in FIG. 7, a power calculating unit 41, a display unit 42, a current measuring unit 43, a control unit 44, a display control unit 45, and a display switch 46. The display device 4C further includes a signal receiving unit 47 for extracting a charging information signal transmitted via power lines L1 from the electric vehicle C from a power supply voltage, and a blocking filter 48 for preventing signal leakage to a power system. In this embodiment, an estimated charging completion time is included in the charging information.

In this embodiment thus configured, when the cable connector G is connected to the connector of the electric vehicle C and the power plug 3 is plugged in the power socket B, the commercial power is supplied to the electric vehicle C to thereby perform the charging of the secondary cell mounted in the electric vehicle C. While charging the battery, the charging information signal is sent from the electric vehicle C via the power lines L1.

Meanwhile, in the display device 4C, the charging information signal received through the signal receiving unit 47 is inputted to the control unit 44 and the control unit 44 outputs, along with the charging information, an integrated result from the power calculating unit 41, electric charges, and/or the like to the display control unit 45. Then, the display control unit 45 displays the estimated charging completion time contained in the charging information signal on the display unit 42, along with the integrated result, the electric charges, and/or the like.

With this embodiment, since the estimated charging completion time is displayed on the display unit 42, the charging completion time can be checked accurately.

In addition, while this embodiment uses so-called power line carrier communications as a method of transmitting the charging information, for example, radio communications units may be arranged in the electric vehicle C and the display device 4, respectively, to transmit the charging information by radio communications.

Fifth Embodiment

A charging cable unit in accordance with a fifth embodiment of the present invention will be described based on FIGS. 8 and 9A to 9D.

The UL standard or the IEC standard describes that an electric leakage breaker should be arranged at a location less than 30 cm from an outlet socket. Therefore, in this embodiment, an electric leakage breaker 5 is arranged at a location less than 30 cm from a power plug 3 which is plugged in and connected to the power socket B, which is different from the second to fourth embodiments. Hereinafter, the same components as the second and third embodiments are given the same reference numerals, and so a description thereof will be omitted. In this embodiment, the electric leakage breaker 5 is included in the display device 4D.

Figure 8:
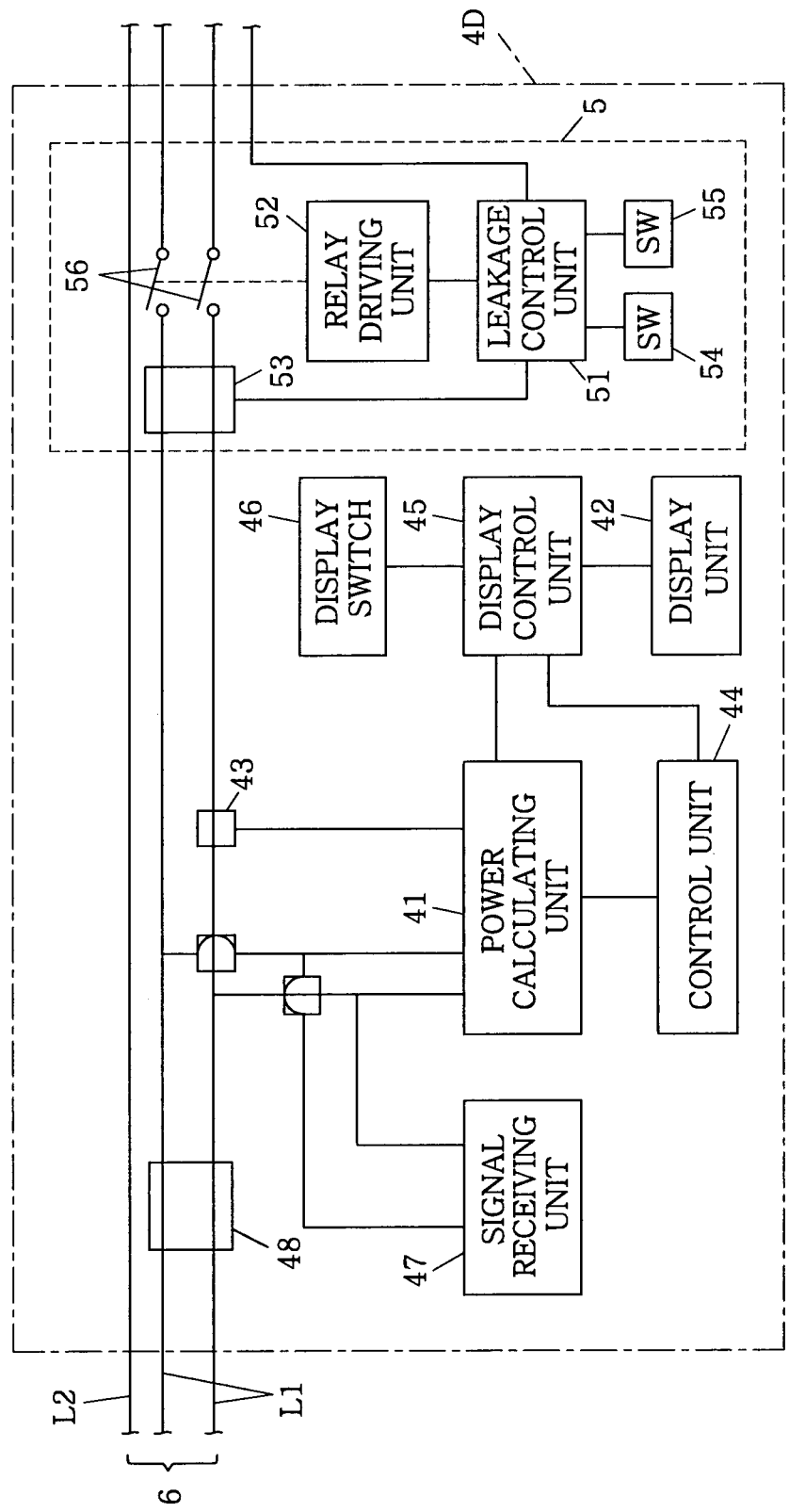
FIG. 8 is a schematic block diagram of a display device of a charging cable unit in accordance with a fifth embodiment.

The electric leakage breaker 5 includes, as shown in FIG. 8, a leakage detecting unit 53 for detecting a leakage current flowing between power lines L1 and a ground line L2, a relay driving unit 52 for opening and closing relay contacts 56 and 56 provided on a current flowing path of the power lines L1, a leakage control unit 51 for controlling the relay driving unit 52 to switch on/off the relay contacts 56 based on a detection result from the leakage detecting unit 53. The electric leakage breaker 5 further includes a leakage test switch 54 for virtually simulating an electric leakage state and a reset switch 55 for releasing a tripped state caused by an electric leakage. In this embodiment, a leakage detection means is implemented by the leakage detecting unit 53, a switching means is implemented by the relay contacts 56, and an electric leakage breaking is implemented by the leakage control unit 51 and the relay driving unit 52.

Figure 9A:
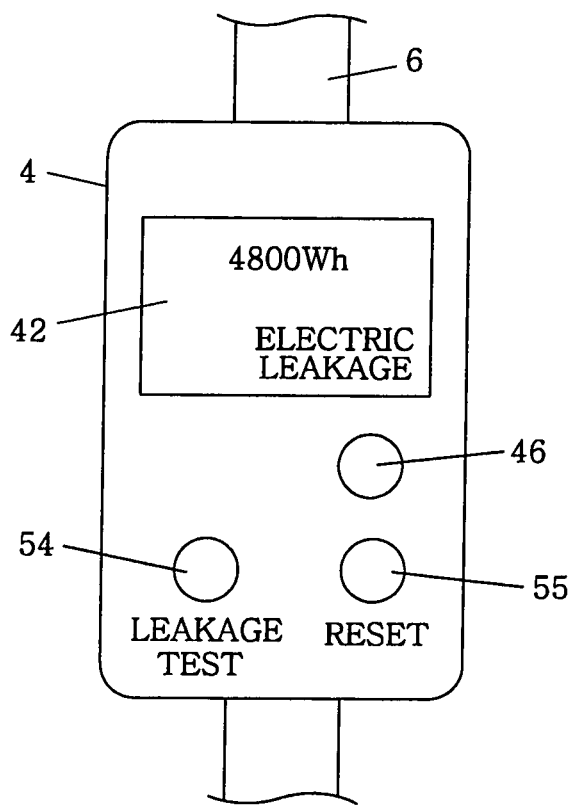
FIGS. 9A to 9C are views for explaining a display device of the charging cable unit in accordance with the fifth embodiment.
Figure 9B:
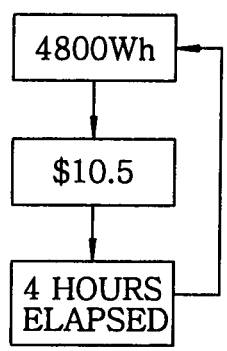

In this embodiment, when the cable connector G is connected to the connector of the electric vehicle C and the power plug 3 is plugged in the power socket B, a commercial power is supplied to the electric vehicle C to thus perform the charging of the secondary cell in the electric vehicle C. As shown in FIG. 9A, the amount of power used is displayed on the display device 4. Also, each time the display switch 46 is pressed, the display state is switched in the order of amount of power used→electric charges→elapsed charging time→amount of power used (see FIG. 9B).

Further, when an electric leakage (a state where a leakage current is flowing between one of the power lines L1 and the ground line L2) is detected by the leakage detecting unit 53, the leakage control unit 51 controls the relay driving unit 52 to switch off the relay contacts 56 and stops power feeding to the electric vehicle C. At this point, a sign, e.g., 'electric leakage' in FIG. 9A which indicates the occurrence of the electric leakage is displayed on the display unit 42.

Figure 9C:
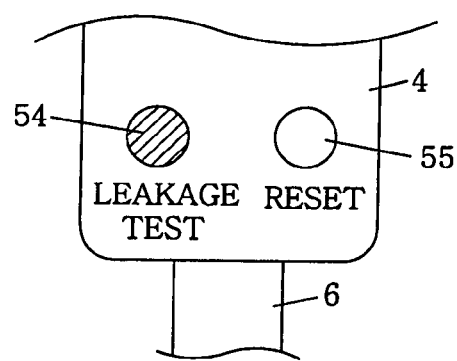

In addition, when the leakage test switch 54 is pressed, the relay contacts 56 are switched off as described above. That is, a leakage state can be virtually simulated. At this time, a sign indicating that a leakage test is being simulated may be displayed. As shown in FIG. 9C, a luminescent display may be employed by a light emitting leakage test switch 54.

With this embodiment, if an electric leakage is detected by the leakage detecting unit 53, the relay contacts 56 are opened by the electric leakage breaker (the leakage control unit 51 and the relay driving unit 52), such that power feeding to the electric vehicle C can be cut off. Therefore, a charging system with high safety standard can be provided. Moreover, since an occurrence of the electric leakage can be indicated on the display unit 42, an indicator for displaying the occurrence of the electric leakage may not be provided separately, thereby reducing cost increase.

Figure 9D:
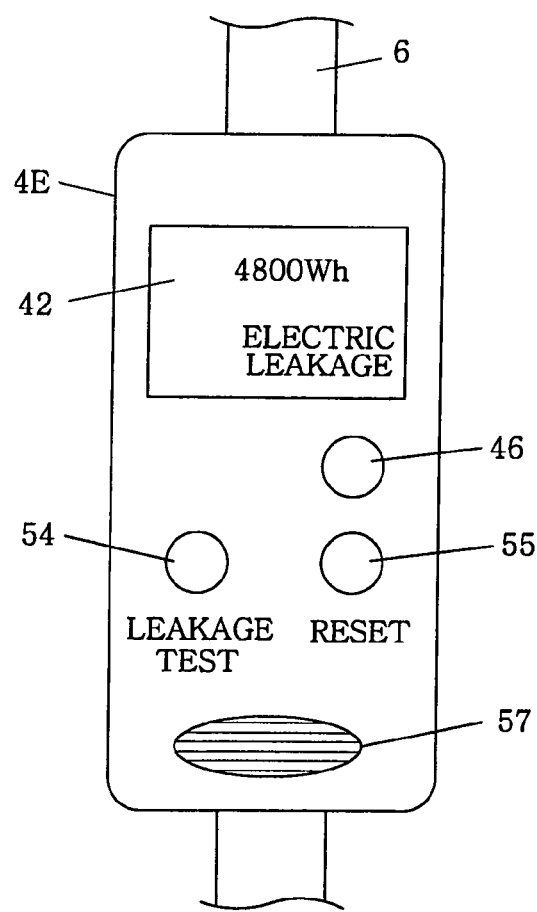
FIG. 9D is a front view of another display device thereof.

Next, FIG. 9D is a front view of another display device 4E. The display device 4E is different from the display device 4D and 4 shown in FIGS. 8 and 9A in that a buzzer (notification means) 57 is provided. This display device 4E is adapted to output an alarm sound informing completion of the charging by the buzzer 57 when charging of the electric vehicle C is completed. Additionally, this display device 4E is configured to allow the user to confirm completion of charging by a charging completion signal contained in charging information sent from the electric vehicle C.

In this display device 4E, when the cable connector G is connected to the connector of the electric vehicle C and the power plug 3 is plugged in the power socket B, a commercial power is supplied to the electric vehicle C to thus perform the charging of the secondary cell in the electric vehicle C. When charging the secondary cell is completed after the lapse of a predetermined period of time, charging information containing a charging completion signal is sent from the electric vehicle C via the power lines L1.

Then, when the signal receiving unit 47 of the display device 4E receives the charging information signal, the charging information signal is inputted to the control unit 44. The control unit 44 drives the buzzer 57 to output an alarm sound based on the charging completion signal contained in the charging information signal.

With this display device 4E, when the charging of the electric vehicle C is completed, an alarm sound informing completion of charging is outputted and, therefore, a user can know completion of charging even when he is at a location away from the charging place.

In addition, although in this embodiment the control unit 44 and the leakage control unit 51 are separately provided, they may be integrated.

Moreover, while the display device 4 and 4A~4E, the buzzer 57, and the earth leakage breaker 5 set forth above may be separately provided and configured to be connectable via the power cable 6, a compact charging cable unit A may be realized wherein the display unit 42, the buzzer 57 and the earth leakage breaker 5 is accommodated together in a device body of the display device 4 as in this embodiment.

Sixth Embodiment

Figure 10:
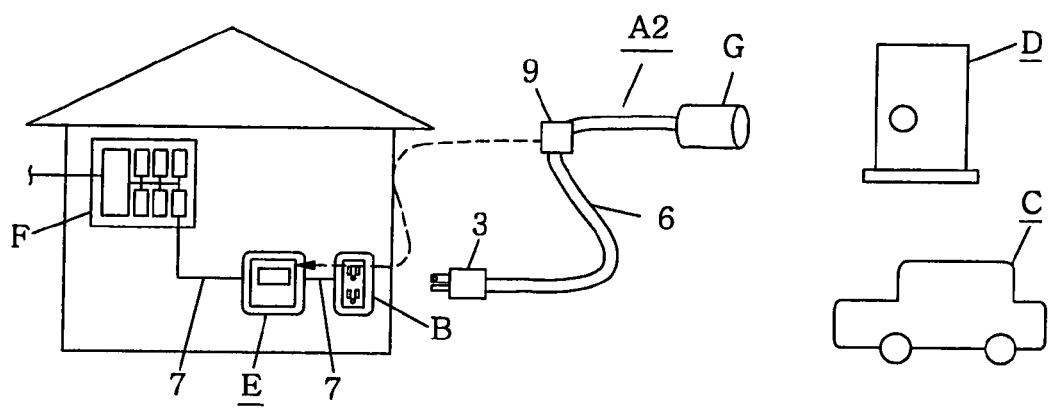
FIG. 10 is a schematic configuration diagram of a charging system in accordance with a sixth embodiment of the present invention.

FIG. 10 is a schematic configuration diagram of a charging system in accordance with a sixth embodiment. The charging system includes a charging cable unit A2 for supplying, e.g., commercial power for charging an emergency battery D or an electric vehicle C (power receiving device) having a secondary cell installed therein, and a display device E provided in, e.g., a house for displaying charging information relating to the secondary cell. In this embodiment, the same reference numerals are assigned to the same as components of the first to fifth embodiments and a description thereof will be omitted. Here, the electric vehicle C includes a so-called hybrid car that runs on a combination of a secondary cell and gasoline as a power source, as well as a car that runs only on a secondary cell (battery) as a power source.

The charging cable unit A2 includes a power plug 3 detachably connected to a power socket B which is supplied with a commercial power, a cable connector G electrically connected to the power plug 3 via a power cable 6, and detachably connected to a connector (not shown) of an emergency battery D (or an electric vehicle C) which is supplied with the commercial power to charge a secondary cell installed therein. The charging cable unit A2 further includes a transmission device 9 for sending charging information relating to the secondary cell. In addition, the commercial power is supplied to the socket B and the display device E from a distribution board F provided in the house via a power wire 7.

Figure 11A:
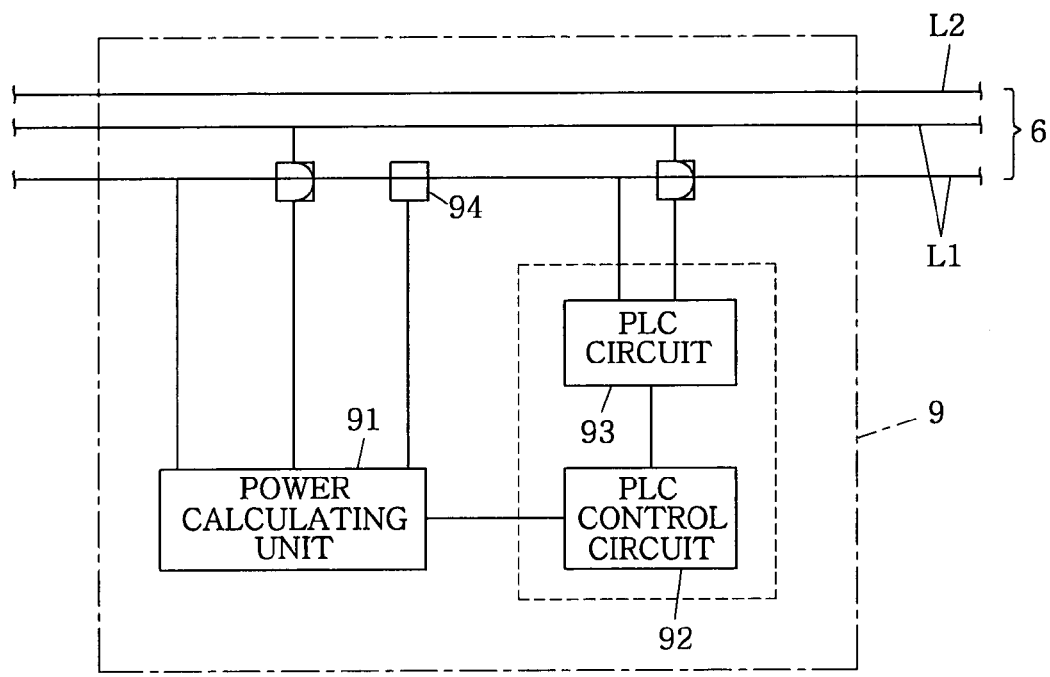
FIG. 11A is a schematic block diagram of a transmission device used in the charging system of the sixth embodiment.

The transmission device 9 includes, as shown in FIG. 11A, a current measuring circuit (e.g., current transformer) 94 for measuring current flowing through one of the power lines L1, a power calculating unit 91 for integrating the amount of power supplied to the emergency battery D (or electric vehicle C) based on a measurement result of the current measuring circuit 94 and a power supply voltage supplied thereto. The transmission device 9 further includes a PLC circuit 93 for superimposing a charging information signal containing the integrated result of the power calculating unit 91 on the power supply voltage, and a PLC control circuit 92 for controlling the PLC circuit 93.

In this embodiment, the power calculating unit 91 has a power circuit (not shown) and, therefore, operating power of the power calculating unit 91, the PLC control circuit 92, and the PLC circuit 93 is supplied through the power circuit. Further, the charging information signal contains an amount of power integrated by the power calculating unit 91 and a charging information acquisition means is implemented by the power calculating unit 91. Further, a transmission means is realized by the PLC circuit 93 and the PLC control circuit 92. The charging information is not limited to the integrated amount of power, but may be, for example, a current value measured by the current measuring circuit 94 or may be information (e.g., a charging voltage value of the secondary cell to be described later, an estimated charging completion time, and/or the like) that are acquired from the power receiving device.

In this embodiment, the emergency battery D or electric vehicle C and the transmission device 9, e.g., PLC control circuit 92 are connected via a signal line (not shown), and a charging information signal containing, e.g., a charging voltage value and/or an estimated charging completion time of the secondary cell is transmitted to the transmission device 9 from the emergency battery D or electric vehicle C. Then, the transmission device 9 transmits, to the display device E, a charging information signal containing the acquired charging voltage value and/or the estimated charging completion time, and the integrated power.

Figure 11B:
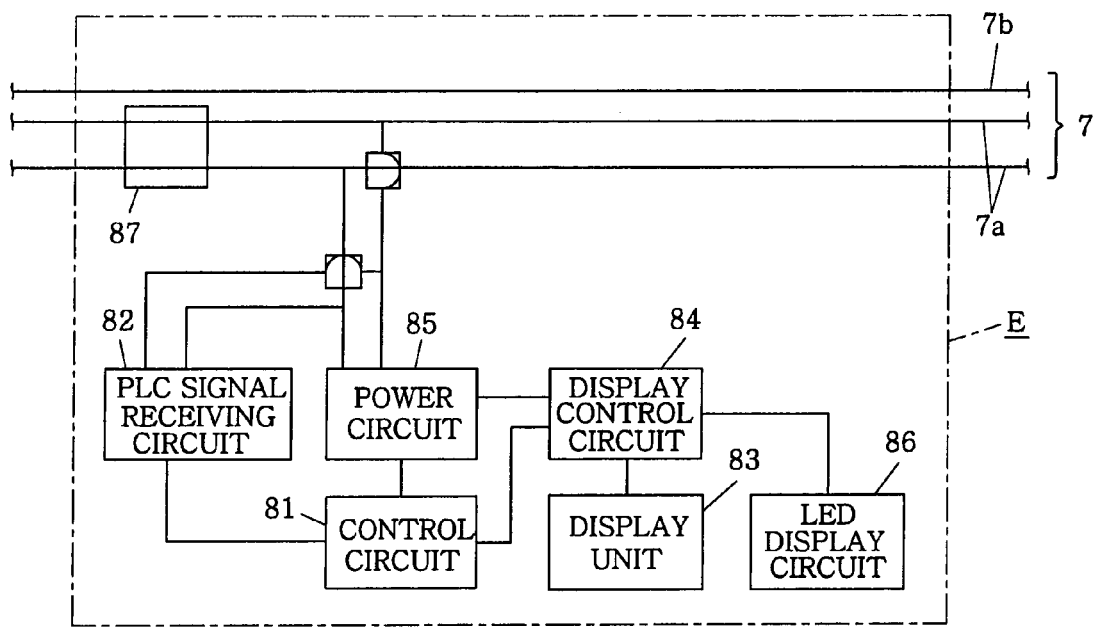
FIG. 11B is a schematic block diagram of a display device used in the charging system of the sixth embodiment.

The display device E includes, as shown in FIG. 11B, a PLC signal receiving circuit 82 for separating the charging information signal sent from the charging cable unit A2, from a power supply voltage, a display circuit 83 for displaying the received charging information, a display control circuit 84 for controlling contents to be displayed by the display unit 83. The display device E further includes a control circuit 81 for performing overall control of each of the parts in the display device E, a power circuit 85 for generating operating power required for each part, and a blocking filter 87 for preventing signal leakage to a power system. In this embodiment, receiving means is implemented by the PLC signal receiving circuit 82, and display means is implemented by the display control circuit 84 and the display unit 83.

The control circuit 81 includes, e.g., CPU and calculates electric charges and elapsed charging time to be described later based on the integrated amount of power and the charging voltage value of the secondary cell that are contained in the charging information signal received by the PLC signal receiving circuit 82. And, the control circuit 81 outputs the calculated electric charges and elapsed charging time and the acquired estimated charging completion time to the display control circuit 84 along with the integrated amount of power.

Figure 12A:
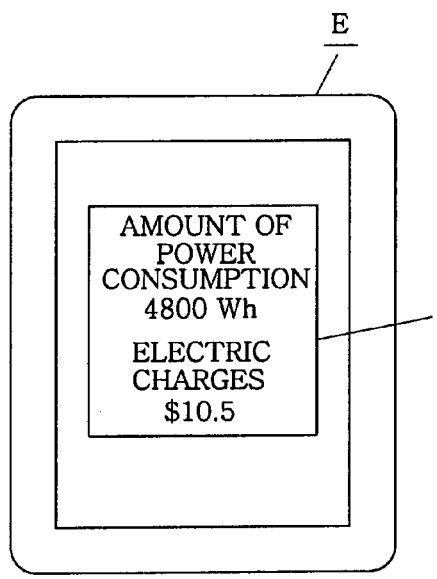
FIGS. 12A and 12B are display examples of the display device shown in FIG. 11B.

The display unit 83 includes, e.g., a liquid crystal panel 83a as shown in FIG. 12A and displays one or more of the charging information (amount of power, electricity cost, elapsed charging time, or estimated charging completion time) on the liquid crystal panel 83a in response to an instruction from the display control circuit 84. In addition, the display unit is not limited to the liquid crystal panel, but may be, e.g., a 7-segment display.

Figure 12B:
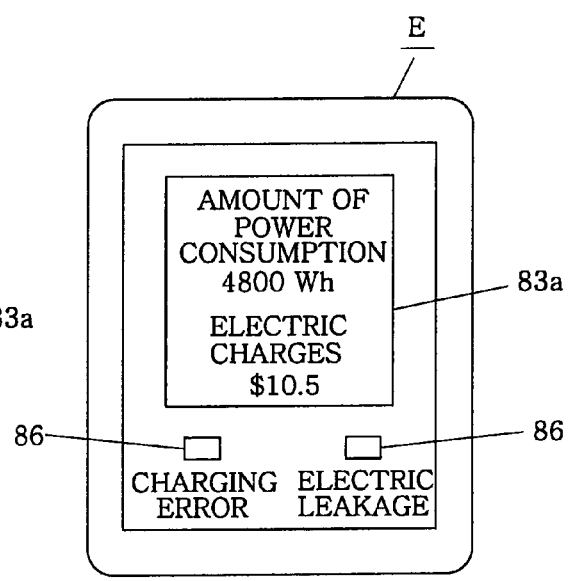
Figure 12C:
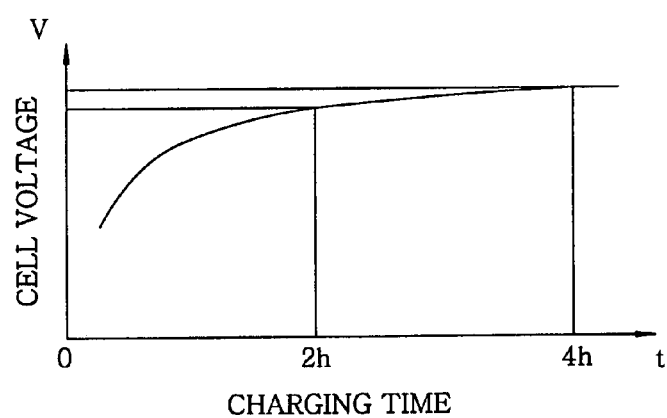
FIG. 12C is a graph showing characteristics of charging to the secondary cell.

FIG. 12C is a graph showing the characteristics of charging to the secondary cell. The charge level of the secondary cell is generally obtained by measuring a cell voltage. In this embodiment, the control circuit 81 calculates, e.g., the elapsed charging time and/or remaining charging time by comparing a change in the charging voltage value of the secondary cell included in the charging information signal with the charging characteristics shown in FIG. 12C.

The operation of this charging system will be described. First, when the cable connector G is connected to the connector of the emergency battery D or electric vehicle C and the power plug 3 is plugged in the power socket B, a commercial power is supplied to the emergency battery D or electric vehicle C to thus perform the charging of the secondary cell installed therein.

Then, the power calculating unit 91 of the transmission device 9 integrates the amount of power consumed in the charging based on the measurement result of the current measuring circuit 94 and the power supply voltage supplied thereto, and outputs to the PLC control circuit 93 as a charging information signal including the integrated amount of power and a charging voltage value of the secondary cell and/or an estimated charging completion time which are inputted from the emergency battery D or electric vehicle C. Then, the PLC control circuit 92 superimposes the charging information signal on the power supply voltage by using the PLC circuit 93.

Meanwhile, in the display device E, the charging information signal transmitted via power wires 7a and 7a is separated from the power supply voltage by the PLC signal receiving circuit 82, and inputted to the control circuit 81. The control circuit 81 calculates electric charges on the basis of the integrated amount of power contained in the charging information signal and further calculates the elapsed charging time and the remaining charging time on the basis of the change in the charging voltage value of the secondary cell to thus output them to the display control circuit 84. At this point, the estimated charging completion time is also outputted to the display control circuit 84.

The display control circuit 84 displays the cumulative amount of power used and electric charges on the liquid crystal panel 83a of the display unit 83, e.g., as shown in FIG. 12A. Although FIG. 12A shows that the cumulative amount of power used and the electric charges are displayed on the liquid crystal panel 83a, this is only an example and, e.g., elapsed charging time, remaining charging time, estimated time of completion of charging, and/or the like may be displayed thereon.

With this embodiment, charging information relating to the secondary cell is displayed by the display device 9 which can be provided at home. Therefore, the user can know the charging condition without going to a charging place, and an easy-to-use charging system can be achieved. Additionally, a power receiving device (i.e., emergency battery D or electric vehicle C) is not needed to be equipped with a transmission function for transmitting the charging information, so that this system is applicable to various types of power receiving devices. As a result, a charging system with high flexibility can be achieved.

Furthermore, since the cumulative amount of power supplied to a power receiving device is displayed on the display device E, the user can estimate a charging completion time by comparing the known amount of power upon completion of charging with the displayed cumulative amount of power, without going to the charging place many times, so that convenience of the system can be further improved. If the display device E is configured to display electric charges thereon, the user is able to know how much electricity cost is required for charging, which improves its convenience.

Moreover, since the charging information signal is superimposed on the commercial power in this embodiment, a signal line for transmitting the charging information signal is not needed. As a result, a charging system can be realized relatively at a low cost. Further, if the display device E is configured to display the estimated charging completion time thereon, a time for completing charging can be known exactly.

For example, if a charging error is occurred, a signal indicative of a charging error is sent to the transmission device 9 from the emergency battery D or electric vehicle C via a signal line (not shown), which is in turn sent to the display device E from the transmission device 9 by power line carrier communications. Thus, the occurrence of the charging error may be reported by an LED display circuit 86 as shown in FIG. 12B.

Seventh Embodiment

Figure 13:
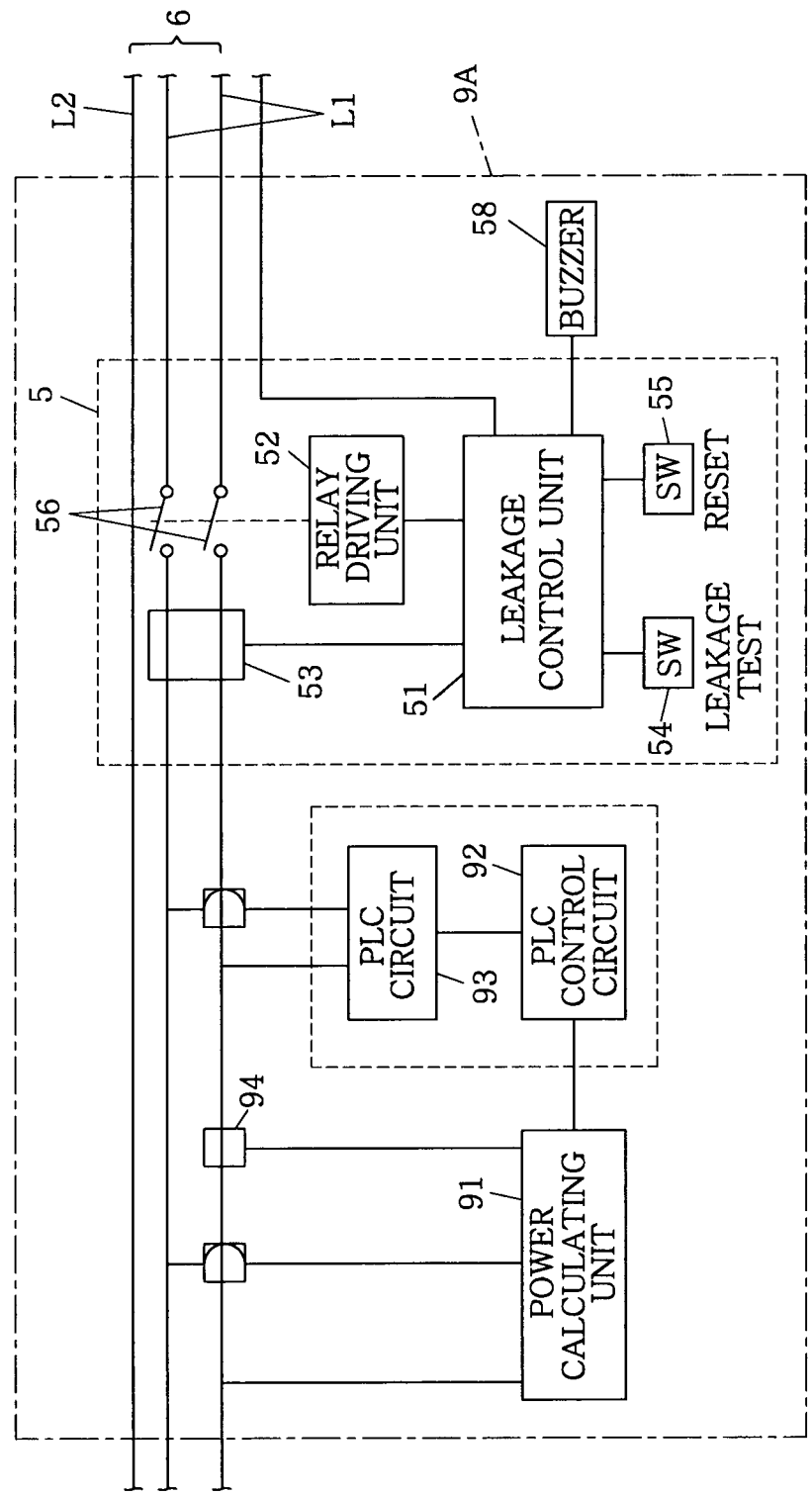
FIG. 13 is a schematic block diagram of a transmission device employed in a charging system in accordance with a seventh embodiment of the present invention.

A charging system in accordance with a seventh embodiment of the present invention will be described based on FIG. 13. This embodiment is different from the sixth embodiment in that the above-described charging cable unit A2 further includes an electric leakage breaking function. In addition, other configurations are the same as those of the sixth embodiment, and therefore, the same reference numerals are assigned to the same components so that its description will be omitted.

The charging system of this embodiment includes a charging cable unit A2 and a display device E. The charging cable unit A2 includes a power plug 3, a cable connector G, and a transmission device 9A. Further, the transmission device 9A includes, as shown in FIG. 13, a power calculating unit 91, a PLC control circuit 92, a PLC circuit 93, and an electric leakage breaker 5.

The electric leakage breaker 5 includes a leakage detecting unit (e.g., zero-phase current transformer) 53 for detecting a leakage current flowing between one of the power line L1 and the ground line L2, a relay driving unit 52 for opening and closing relay contacts 56 arranged in the current flowing path of the power lines L1, and a leakage control unit 51 for controlling the relay driving unit 52 to switch on/off the relay contacts 56 based on a detection result from the leakage detecting unit 53.

The electric leakage breaker 5 further includes a leakage test switch 54 for virtually simulating an electric leakage state, a reset switch 55 for releasing a tripped state caused by an electric leakage, and a buzzer 58 for alarming the occurrence of an electric leakage. In this embodiment, a leakage detection means is implemented by the leakage detecting unit 53, a switching means is implemented by the relay contacts 56, and a switching control means is realized by the leakage control unit 51 and the relay driving unit 52.

In this charging system, when the cable connector G is connected to the connector of the emergency battery D or electric vehicle C and the power plug 3 is plugged in the power socket B, a commercial power is supplied to the emergency battery D or electric vehicle C to thus perform the charging of the secondary cell in the emergency battery D or electric vehicle C. Meanwhile, if an electric leakage (a state where a leakage current flows between one of the power lines L1 and the ground) is detected by the leakage detecting unit 53 while charging the battery, the leakage control unit 51 controls the relay driving unit 52 to switch off the relay contacts 56 and cut off power feeding to the emergency battery D or electric vehicle C.

The leakage control unit 51 further operates the buzzer 58 to alarm the occurrence of the electric leakage. At this time, a signal indicative of the occurrence of the electric leakage may be sent to the display device E by power line carrier communications and, as shown in FIG. 12B, the occurrence of the electric leakage may be reported by the LED display circuit 86.

In addition, if the leakage test switch 54 is pressed, the relay contacts 56 are switched off as mentioned above, so that an electric leakage state can be virtually simulated.

With this embodiment, when an electric leakage is detected by the leakage detecting unit 53, the relay contacts 56 are switched off by the relay driving unit 52, so that power feeding to the emergency battery D or electric vehicle C can be cut off to thereby provide a charging system with high safety standard.

Moreover, since the power calculating unit 91, PLC control circuit 92, PLC circuit 93, and the electric leakage breaker 5 are accommodated together in a device body of one transmission device 9A in this embodiment, a compact charging cable unit can be achieved.

Eighth Embodiment

Figure 14A:
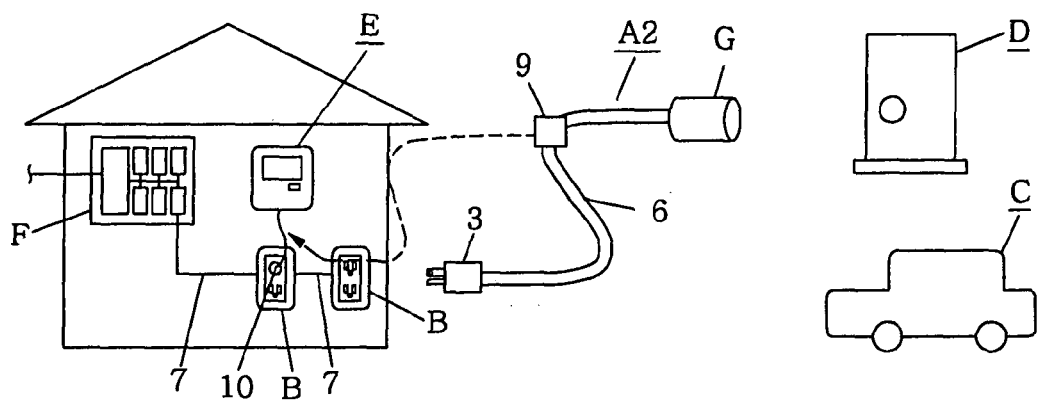
FIG. 14A is a schematic configuration diagram of a charging system in accordance with an eighth embodiment of the present invention.

A charging system in accordance with an eighth embodiment of the present invention will be described referring to FIGS. 14A to 14C. This embodiment is different from the sixth and seventh embodiments in that a display device E is detachably connected to a power socket B with a plug 10. In addition, other configurations are the same as those of the sixth and seventh embodiments, and thus the same reference numerals are assigned to the same components and a description of which will be omitted.

Figure 14B:
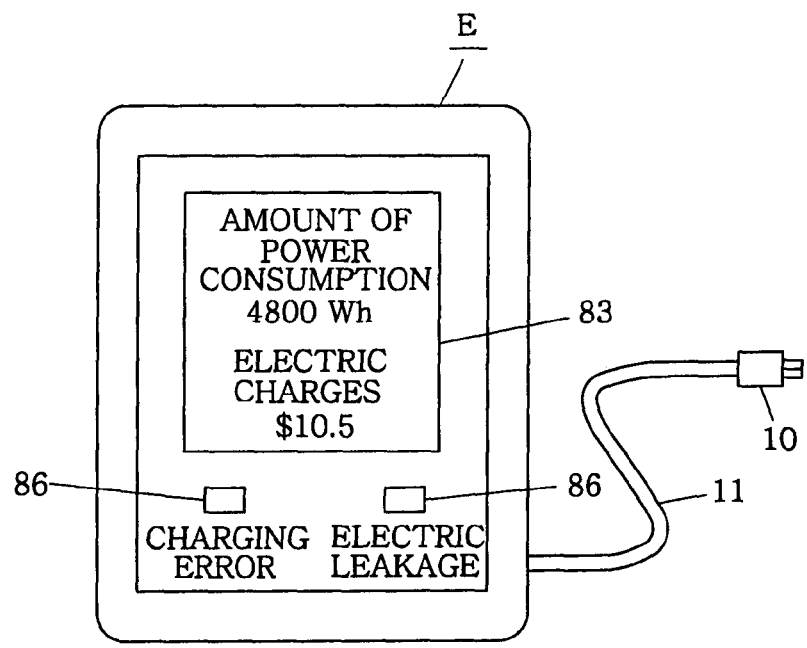
FIG. 14B is a display example of a display device employed in the charging system of the eighth embodiment.
Figure 14C:
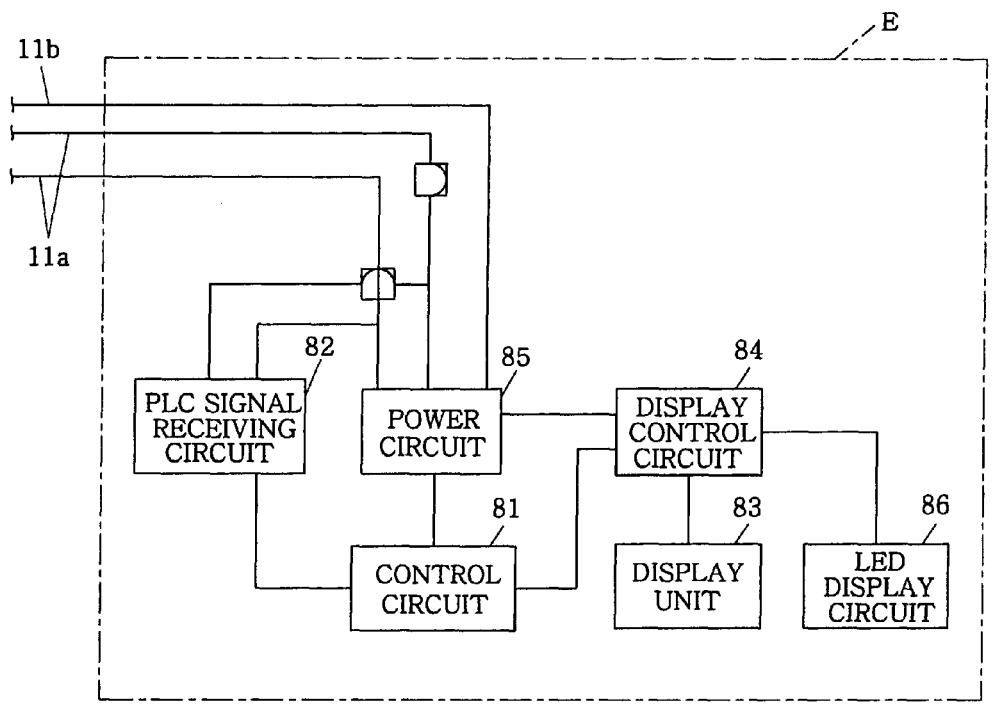
FIG. 14C is a schematic block diagram thereof.

The display device E of this embodiment includes, as shown in FIGS. 14B and 14C, a PLC signal receiving circuit 82, a display unit 83, a display control circuit 84, a control circuit 81, a power circuit 85 and an LED display circuit 86. In the display device E, the plug 10 is provided at the end of a power cable 11 and is detachably connected to the power socket B. Thus, the display device E is plugged in and connected to the power socket B via the plug 10, thereby realizing a charging system including the charging cable unit A2 and the display device E (see FIG. 14A). The operation of this system is similar to those in the sixth and seventh embodiments, and so a description thereof will be omitted.

With this embodiment, charging information relating to the secondary cell is displayed by the display device 9 which can be provided at home. Therefore, the user can know the charging condition without going to a charging place, and an easy-to-use charging system can be achieved. Additionally, a power receiving device (i.e., emergency battery D or electric vehicle C) is not needed to be equipped with a transmission function for transmitting the charging information, so that this system is applicable to various types of power receiving devices. As a result, a charging system with high flexibility can be achieved.

Also, the socket to which this display device E is connected may be electrically connected to the socket B to which the charging cable unit A2 is connected and there can be achieved a charging system capable of knowing the charging condition of the secondary cell even at a location (home, etc.) away from a charging place.

Ninth Embodiment

A charging system in accordance with a ninth embodiment of the present invention will be described based on FIGS. 15A and 15B. In the sixth to eighth embodiments, charging information relating to the secondary cell is transmitted by so-called power line carrier communications, while, in this embodiment, the charging information is transmitted by radio waves. In addition, the same reference numerals are assigned to the same components as the sixth to eighth embodiments, and so a description thereof will be omitted.

Figure 15A:
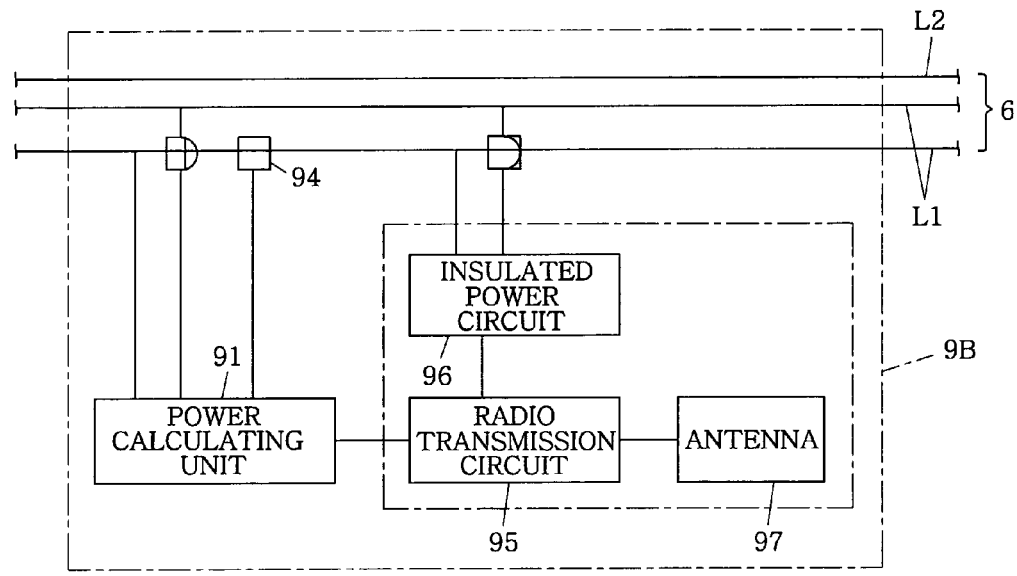
FIG. 15A is a schematic block diagram of a transmission device employed in a charging system in accordance with a ninth embodiment of the present invention.
Figure 15B:
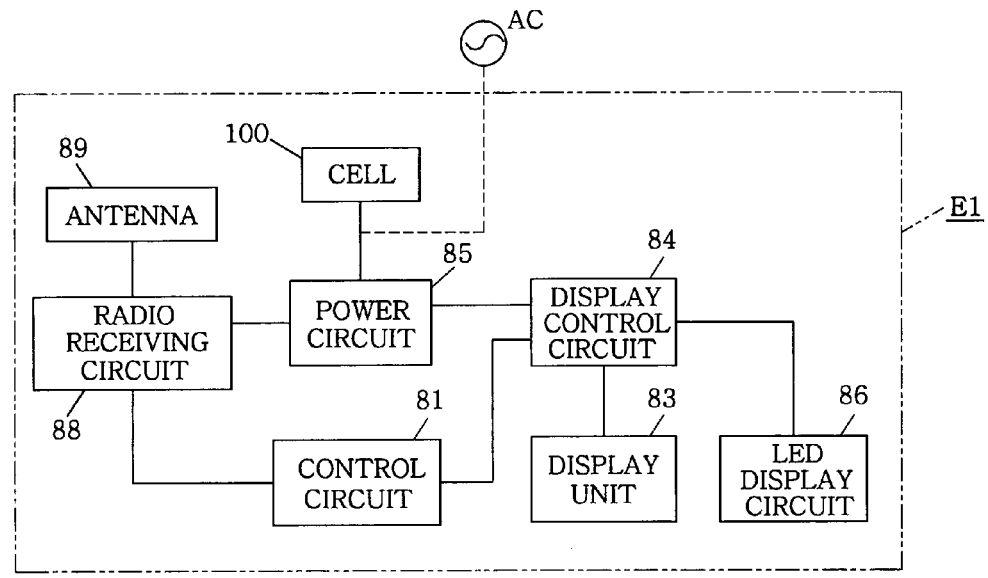
FIG. 15B is a schematic block diagram of a display device used therein.
Figure 16A:
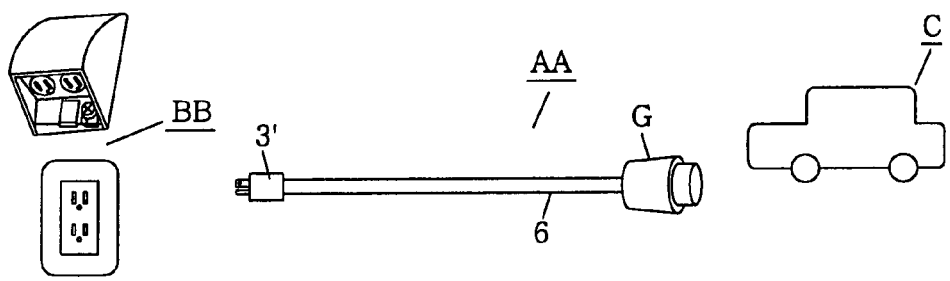
FIG. 16A is a schematic view of a system using a charging cable unit of a conventional example.
Figure 16B:
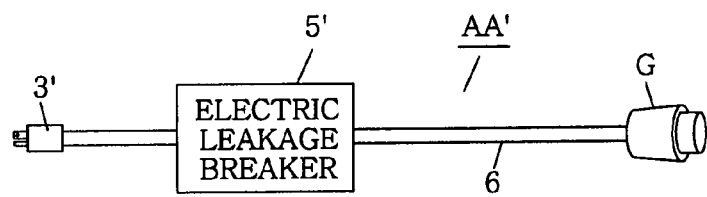
FIG. 16B is a view showing another example of the conventional charging cable unit.
Figure 17:
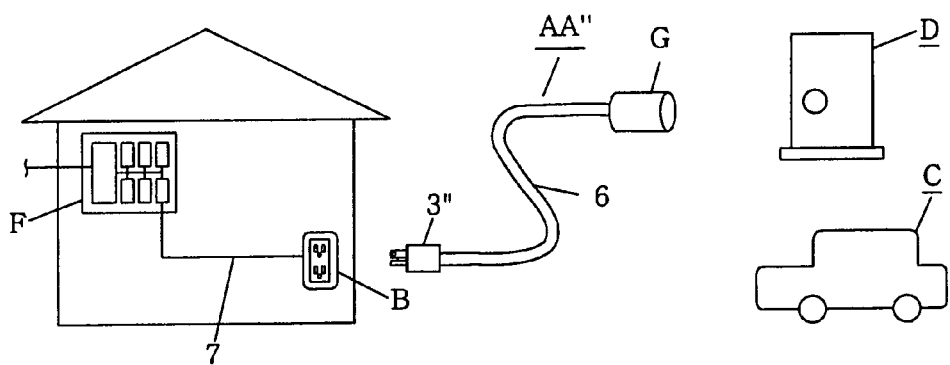
FIG. 17 is a schematic configuration diagram of a charging system of a conventional example.

The transmission device 9B of this embodiment includes, as shown in FIG. 15A, the power calculating unit 91, a radio transmission circuit 95 for modulating a charging information signal containing a integrated result from the power calculating unit 91 and radio-transmitting the modulated charging information signal through an antenna 97, and an insulated power circuit 96 for supplying operating power to the radio transmission circuit 95. In this embodiment, a transmission means is realized by the radio transmission circuit 95 and the antenna 97.

The display device E1 includes the control circuit 81, the display unit 83, the display control circuit 84, the power circuit 85, the LED display circuit 86, and an antenna 89 for receiving a radio signal. In addition, the display device E1 includes a radio receiving circuit 88 which receives the charging information signal by amplifying and demodulating the radio signal received by the antenna 89, and a cell 100 for supplying power to the power circuit 85. The power may be supplied to the power circuit 85 by a commercial power source AC. In this embodiment, a receiving means is realized by the radio receiving circuit 88 and the antenna 89.

In this embodiment, when the cable connector G is connected to the connector of the emergency battery D or electric vehicle C and the power plug 3 is plugged in the power socket B, a commercial power is supplied to the emergency battery D or electric vehicle C to thus perform the charging of the secondary cell in the emergency battery D or electric vehicle C. The power calculating unit 91 of the transmission device 9B integrates the amount of power consumed for the charging based on the measurement result of the current measuring circuit 94 and the power supply voltage supplied thereto. Then, the power calculating unit 91 outputs to the radio transmission circuit 95 a charging information signal containing the integrated result and the secondary cell charging voltage value which is inputted from the emergency battery D or electric vehicle C. The radio transmission circuit 95 modulates and radio-transmits the charging information signal through the antenna 97.

Meanwhile, the radio receiving circuit 88 in the display device E1 amplifies and demodulates the radio signal received through the antenna 89 into the charging information signal, and then inputs the demodulated charging information signal to the control circuit 81. The control circuit 81 calculates electric charges and elapsed charging time on the basis of the input charging information, and inputs the calculated electric charges and elapsed charging time, and an integrated amount of power (amount of power consumed) to the display control circuit 84. Accordingly, the display control circuit 84 displays the amount of power consumed, an electric charges, an elapsed charging time, etc. on the liquid crystal panel 83a of the display unit 83.

With this embodiment, charging information relating to the secondary cell is displayed by the display device 9B which can be provided at home. Therefore, the user can know the charging condition without going to a charging place, and an easy-to-use charging system can be achieved. Additionally, a power receiving device (i.e., emergency battery D or electric vehicle C) is not needed to be equipped with a transmission function for transmitting the charging information, so that this system is applicable to various types of power receiving devices. As a result, a charging system with high flexibility can be achieved.

Moreover, since this system uses radio waves, the charging condition of the secondary battery can be known even at a remote place as far as the radio waves can arrive.

While the invention has been shown and described with respect to the particular embodiments, it will be understood by those skilled in the art that various changes and modification may be made.

What is claimed is:

1. A charging cable for an electric vehicle comprising:
   a power plug adapted to be detachably connected to a power socket of a commercial power source;
   a temperature detecting unit for detecting a temperature of the power plug;
   a cable connector adapted to be detachably connected to an electric vehicle for supplying a charging current to a battery of the electric vehicle;
   a switching unit for opening and closing a current path between the power plug and the cable connector;
   a leakage detecting unit for detecting an electric leakage based on a current flowing through the current path;
   a power cutoff unit for opening the switching unit when the detected temperature of the temperature detecting unit exceeds a threshold value or when the leakage detecting unit detects the electric leakage; and
   a display device for displaying charging information of the electric vehicle.

2. The charging cable of claim 1, wherein the display device includes a power calculating unit for integrating an amount of power supplied to a power receiving device and a display unit for displaying an integrated amount of the power calculating unit.

3. The charging cable of claim 2, wherein the display unit displays an equivalent electric charges converted from the integrated amount of power of the power calculating unit and/or an elapsed charging time.

4. A charging system for an electric vehicle comprising:
   a charging cable including:
      a power plug adapted to be detachably connected to a power socket of a commercial power source;
      a temperature detecting unit for detecting a temperature of the power plug;
      a cable connector adapted to be detachably connected to an electric vehicle for supplying a charging current to a battery of the electric vehicle;
      a switching unit for opening and closing a current path between the power plug and the cable connector;
      a leakage detecting unit for detecting an electric leakage based on a current flowing through the current path; and
      a power cutoff unit for opening the switching unit when the detected temperature of the temperature detecting unit exceeds a threshold value or when the leakage detecting unit detects the electric leakage;
   a transmission apparatus including a charging information acquisition unit for obtaining charging information relating to a secondary cell and a transmission unit for transmitting the acquired charging information; and
   a display device including a receiving unit for receiving a signal of the charging information transmitted from the transmission apparatus and a display unit for displaying the received charging information,
   wherein the display device is provided separately from the charging cable, and the charging information is an integrated result of an amount of power.

5. The charging system of claim 4, wherein the transmission unit superimposes a signal of the charging information on commercial power,
   the receiving unit separates the signal of the charging information superimposed on the commercial power therefrom, and
   the transmission unit and the receiving unit each includes a PLC circuit.

6. The charging system of claim 4 or 5, wherein the display device displays, on the display unit, an amount of power supplied to a power receiving device and/or an electric charge calculated from the amount of power.

* * * * *